(12) United States Patent
Taynton et al.

(10) Patent No.: US 12,398,264 B2
(45) Date of Patent: Aug. 26, 2025

(54) VITRIMERS CONTAINING ADDITIVES

(71) Applicant: Mallinda, Denver, CO (US)

(72) Inventors: Philip Taynton, Boulder, CO (US);
Heather Rubin, Broomfield, CO (US);
Sara Meyer, Thornton, CO (US);
Marina Tobey, Thornton, CO (US);
Erik Rognerud, Littleton, CO (US);
Sarah Sadowski, Littleton, CO (US)

(73) Assignee: Mallinda, Denver, CO (US)

( * ) Notice: Subject to any disclaimer, the term of this patent is extended or adjusted under 35 U.S.C. 154(b) by 0 days.

(21) Appl. No.: 17/685,755

(22) Filed: Mar. 3, 2022

(65) Prior Publication Data

US 2022/0372273 A1    Nov. 24, 2022

Related U.S. Application Data

(60) Provisional application No. 63/156,257, filed on Mar. 3, 2021.

(51) Int. Cl.
| | |
|---|---|
| *B29C 70/48* | (2006.01) |
| *B29C 70/52* | (2006.01) |
| *C08G 59/50* | (2006.01) |
| *C08J 5/24* | (2006.01) |
| *C08L 63/00* | (2006.01) |
| *B29K 96/00* | (2006.01) |
| *B29K 105/16* | (2006.01) |

(52) U.S. Cl.
CPC ............ *C08L 63/00* (2013.01); *B29C 70/48* (2013.01); *B29C 70/52* (2013.01); *C08G 59/5073* (2013.01); *C08J 5/24* (2013.01); *B29K 2096/00* (2013.01); *B29K 2105/16* (2013.01); *B29K 2995/0016* (2013.01); *C08J 2363/00* (2013.01); *C08L 2201/02* (2013.01)

(58) Field of Classification Search
CPC ...... C08L 63/00; C08L 2201/02; B29C 70/48; B29C 70/52; C08G 59/5073; C08J 5/24; C08J 2363/00; B29K 2096/00; B29K 2105/16; B29K 2995/0016
USPC ....................................................... 523/429
See application file for complete search history.

(56) References Cited

U.S. PATENT DOCUMENTS

| | | |
|---|---|---|
| 6,596,373 B1 | 7/2003 | Kishi et al. |
| 9,453,099 B2 | 9/2016 | Zhang et al. |

(Continued)

FOREIGN PATENT DOCUMENTS

| | | |
|---|---|---|
| WO | 2020051506 A1 | 3/2020 |
| WO | 2022187451 A1 | 9/2022 |

OTHER PUBLICATIONS

Dhers et al., "A fully bio-based polyimine vitrimer derived from fructose," Green Chem. 21:1596-1601, 2019.

(Continued)

*Primary Examiner* — David T Karst
(74) *Attorney, Agent, or Firm* — Elevated IP, LLC

(57) ABSTRACT

Covalent network polymers that include one or more of a cure rate modifying (CRM) additive, a tack modifying additive, a flame retardant additive, a physical additive, and a viscosity modifying additive allow the viscosity, pot life, tackiness and safety of chemical mixtures and products to be tailored without sacrificing the mechanical properties or reprocessability of the final vitrimers. Use of additives also enables previously infeasible manufacturing techniques.

16 Claims, 5 Drawing Sheets

(56) References Cited

U.S. PATENT DOCUMENTS

| | | |
|---|---|---|
| 2016/0369074 A1 | 12/2016 | Hadley et al. |
| 2017/0047142 A1* | 2/2017 | Disson ............... C08G 59/4238 |
| 2017/0237119 A1 | 8/2017 | Zhang et al. |
| 2018/0037014 A1 | 2/2018 | Endo et al. |
| 2020/0247937 A1 | 8/2020 | Taynton et al. |
| 2021/0008840 A1 | 1/2021 | Gurijala et al. |
| 2021/0009789 A1* | 1/2021 | Soheilian .................. B32B 5/12 |

OTHER PUBLICATIONS

Hajj et al., "Network design to control polyimine vitrimer properties: Physical versus chemical approach," Macromolecules 53:3796-3805, 2020.

Liu et al., "Tuning the mechanical and dynamic properties of imine bond crosslinked elastomeric vitrimers by manipulating the crosslinking degree," Polym. Chem. 11:1348-1355, 2020.

* cited by examiner

VITRIMERS CONTAINING ADDITIVES

CROSS-REFERENCE TO RELATED APPLICATIONS

This application claims the benefit of and priority to U.S. Provisional Patent Application Ser. No. 63/156,257, filed Mar. 3, 2021, which is hereby incorporated by reference in its entirety.

STATEMENT REGARDING FEDERALLY SPONSORED RESEARCH

None.

BACKGROUND

The ability to chemically alter the physical properties of materials is valuable from both practical and commercial perspectives. For example, materials that are too sticky or too low in viscosity to work with are impractical, but the ability to alter the tackiness or consistency of materials can make the materials amenable to processing and therefore commerically viable. Likewise, hazardous materials can sometimes be made safer, and therefore more practical, through chemical manipulation. Lastly, chemical reactions that can be accelerated, such as through catalysis, allow for faster processing and thus higher throughput leading to commercial advantages.

Of course, chemical manipulation that positively changes one property can have an unintentional negative affect on another material property, so a deep understanding of the class of materials being manipulated is necessary to achieve beneficial outcomes.

SUMMARY

The present invention generally relates to covalent network polymers capable of undergoing dynamic bond formation/breakage that promotes self-healing, weldability, and malleability. The covalent network polymers disclosed herein include additives that (i) modify the rate at which imine-linked oligomers and epoxides crosslink, or cure, without altering the ultimate glass transition temperature ($T_g$) of the system, (ii) turn off the temperature-sensitive reversibility of curing imine-linked vitrimer systems (a phenomenon attributable to the endothermic nature of the vitrimeric bond exchange reaction), (iii) provide temperature-dependent cure acceleration, and (iv) maintain the weldable and recyclable properties provided by imine-linked bond exchange within cured materials.

The disclosed covalent network polymers include one or more of a cure rate modifying (CRM) additive, a tack modifying additive, a flame retardant additive, a physical additive, and a viscosity modifying additive that allow(s) the viscosity, pot life, tackiness and safety of chemical mixtures and products to be tailored without sacrificing the mechanical properties or reprocessability of the final vitrimers. Use of additives disclosed herein also enables previously infeasible manufacturing techniques, such as wet winding and towpreg production.

In an aspect, a covalent network polymer is prepared from an imine-linked oligomer, a crosslinker, and one or more of a cure rate modifying (CRM) additive, a tack modifying additive, a flame retardant additive, a physical additive, and a viscosity modifying additive.

In an embodiment, the crosslinker is a monofunctional epoxide, a difunctional epoxide, a polyfunctional epoxide, or combinations or mixtures thereof.

In an embodiment, the CRM additive is a Lewis base. For example, the CRM additive may be selected from the group consisting of imidazoles, anhydrides, acetates, diketones, and combinations thereof. More particularly, the CRM additive may be selected from the group consisting of 1-methylimidazole, acetic anhydride, t-butyl acetate, 2-ethyl-4-methylimidazole, benzil, imidazole, maleic anhydride, succinic anhydride, and combinations thereof.

In an embodiment, the tack modifying additive is selected from the group consisting of talc, kaolin, calcium carbonate, stearic acid, lanolin, paraffin wax, magnesium stearate, magnesium carbonate, barium sulfate silica, silica, polytetrafluoroethylene (PTFE), glass bubbles, calcium silicate, diatomaceous earth, and combinations thereof.

In an embodiment, the flame retardant additive is selected from the group consisting of polytetrafluoroethylene (PTFE), organic brominated compounds, aluminum trihydrate, molybdate/hydroxide complexes, phosphorous-based salts, organic phosphorous, aluminosilicates, halloysite clays, and combinations thereof.

In an embodiment, the physical additive is selected from the group consisting of ceramic microspheres, talc, calcium carbonate, mica, wollastonite, elastinite, silica, carbon black, glass bubbles, core-shell rubbers, clays, kaolin, magnesium carbonate, borosilicate, calcium silicate, limestone, diatomaceous earth, and combinations thereof.

In an embodiment, a covalent network polymer further comprises a slip agent, such as a slip agent selected from the group consisting of PTFE, isopropanol, glycols, silicon fluids, and combinations thereof.

In an embodiment, a covalent network polymer is a vitrimer and a thermosetting polymer, which may be characterized by a glass transition temperature of at least 60° C.

In an embodiment, a composite comprises the covalent network polymer disclosed herein and a woven, non-woven, unidirectional, chopped or shredded fibrous material.

In an aspect, a chemical mixture for forming a covalent network polymer comprises: a mixture of imine-linked oligomers each comprising one or more primary and/or secondary and/or tertiary amines; a polyfunctional epoxide crosslinker; and a cure rate modifying (CRM) additive selected from the group consisting of imidazoles, anhydrides, acetates, diketones, and combinations thereof.

In an embodiment, the chemical mixture further comprises one or more of a tack modifying additive, a flame retardant additive, a physical additive, and a viscosity modifying additive.

In an embodiment, the chemical mixture is applied to a woven, non-woven, unidirectional, chopped or shredded fibrous material.

In an embodiment, a viscosity of the chemical mixture is between 5,000 cP and 100,000 cP, or between 5,000 cP and 80,000 cP, or between 5,000 cP and 50,000 cP. In an embodiment, a viscosity of the chemical mixture is less than 125,000 cP, or less than 100,000 cP, or less than 80,000 cP, or less than 50,000 cP, or less than 30,000 cP, or less than 20,000 cP, or less than 10,000 cP.

In an aspect, a process for forming a covalent network polymer comprises combining an imine-linked oligomer, a crosslinker, and one or more of a cure rate modifying (CRM) additive, a tack modifying additive, a flame retardant additive, a physical additive, and a viscosity modifying additive.

In an embodiment, the process further comprises a step of using the covalent network polymer to: (i) impregnate a woven, non-woven, unidirectional, chopped or shredded fibrous material; (ii) form a film; or (iii) form a three-dimensional object.

In an embodiment, the fibrous material is impregnated by a towpreg wet winding process, a pultrusion process, a prepreg process, an infusion process and/or a resin transfer molding process. In an embodiment, the fibrous material is impregnated by extrusion followed by compaction, pultrusion, slot die coating, solvent dip impregnation and/or hot melt impregnation.

In an embodiment, the film is a stand-alone film or the film is supported on a release liner or the film is a layer in a multilayered device. In an embodiment, the film is formed by extrusion, slot die coating, gravure, Mayer rod, slide, polishing rod and/or lithography.

In an embodiment, a three-dimensional object is formed by injection molding, additive manufacturing, laser cutting and/or CNC machining.

In an embodiment, a process for forming a covalent network polymer further comprises curing the covalent network polymer or chemical mixture, for example, by heating, UV treatment, IR treatment, and/or microwave treatment.

BRIEF DESCRIPTION OF THE DRAWINGS

Illustrative embodiments of the present invention are described in detail below with reference to the attached drawings.

DETAILED DESCRIPTION

Figure 1:
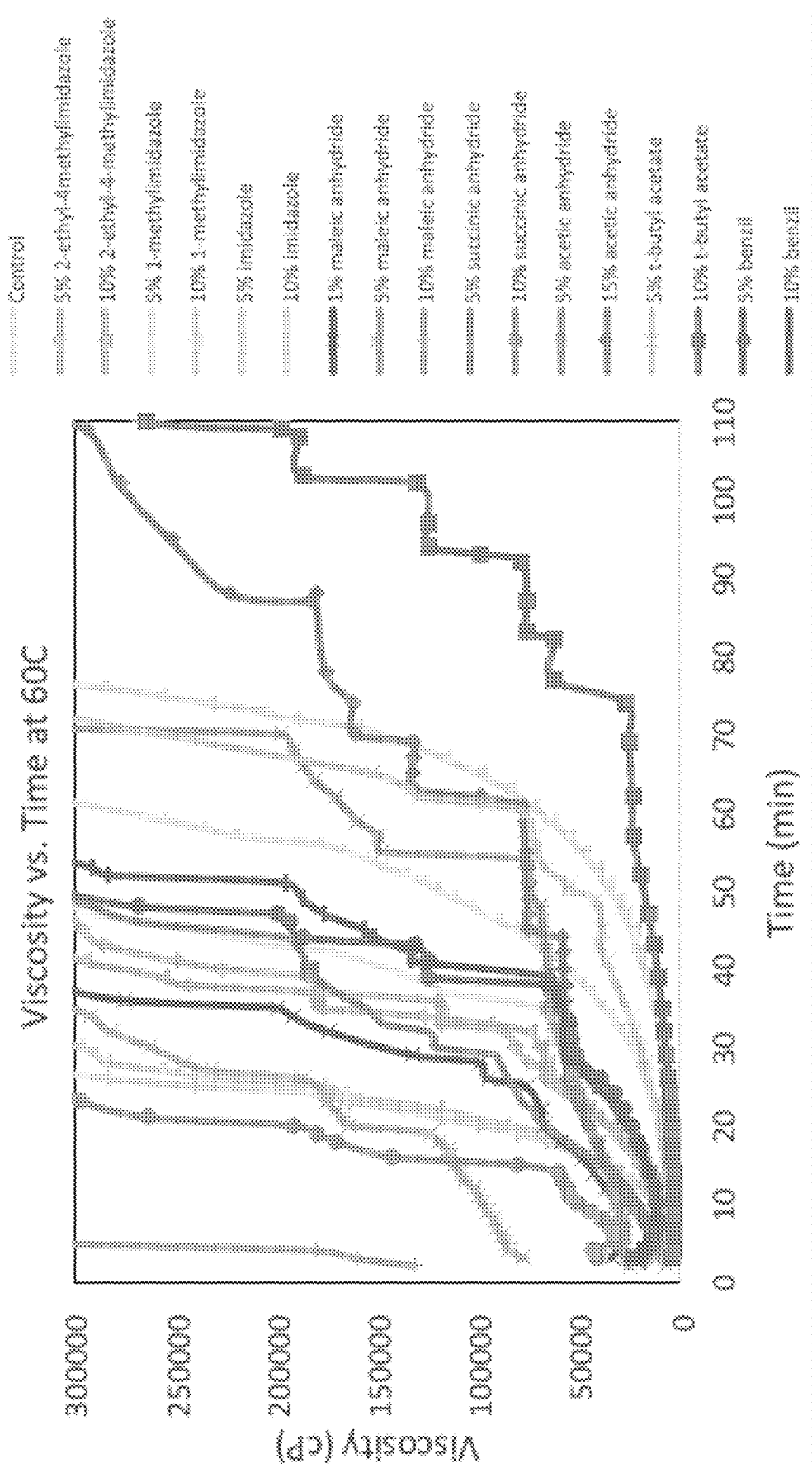
FIG. 1. A graphical representation of viscosity in relation to time (relative to when epoxy was added to the system) of several accelerating agents at different weight percentages run at 60° C.

In general, the terms and phrases used herein have their art-recognized meaning, which can be found by reference to standard texts, journal references and contexts known to those skilled in the art. The following definitions are provided to clarify their specific use in the context of this description.

As used herein, an "imine-linked oligomer" or an "imine-linked polymer" is an oligomer or polymer, respectively, comprising at least one non-terminal imine moiety, such that the C=N portion of the imine is within the oligomer or polymer backbone. In an embodiment, the C=N portion of the imine moiety in an imine-linked oligomer or polymer is within a non-cyclic portion of the backbone.

As used herein, a "moiety" is a part of a molecule.

As used herein, "polyfunctional" is used to describe a molecule comprising at least two designated moieties. For example, a polyfunctional amine comprises at least two amine moieties and a polyfunctional aldehyde or carbonyl comprises at least two aldehyde or carbonyl moieties, respectively. In addition to the designated moieties, polyfunctional molecules may, in some embodiments, contain additional, different moieties.

As used herein, a "crosslinker" is a molecule that chemically reacts with and covalently joins oligomers and/or polymers.

As used herein, a "composite" comprises multiple parts or substances joined in a heterogenous configuration. Composites disclosed herein comprise a covalent network polymer and at least one other material. For example, the covalent network polymer may be layered with the other material, used to impregnate and/or encapsulate the other material, encapsulated by the other material, or otherwise intermingled with the other material.

As used herein, "weight percent" or "wt. %" is calculated as the weight of a component in a mixture divided by the total weight of the mixture prior to curing or drying multiplied by 100.

As used herein, a "slip agent" is a compound acting as an internal lubricant that migrates to the surface of a mixture to reduce friction and improve slip. Surfaces with high slip characteristics are generally resistant to scratching, soiling, and blocking.

"Proximal" and "distal" refer to the relative positions of two or more objects, planes or surfaces. For example, an object that is close in space to a reference point relative to the position of another object is considered proximal to the reference point, whereas an object that is further away in space from a reference point relative to the position of another object is considered distal to the reference point.

The terms "direct and indirect" describe the actions or physical positions of one object relative to another object. For example, an object that "directly" acts upon or touches another object does so without intervention from an intermediary. Contrarily, an object that "indirectly" acts upon or touches another object does so through an intermediary (e.g., a third component).

Exemplary imine-linked covalent network polymers and methods of producing imine-linked covalent network polymers are described in International Patent Pub. No. WO 2020/051506, which is hereby incorporated by reference in its entirety. In summary, imine-linked covalent network polymers may be produced by mixing a polyfunctional aldehyde, such as terephthaldehyde, with one or more polyfunctional amines, in a non-stoichometric ratio to produce amine-terminated imine-linked oligomers, which are subsequently purified over molecular sieves, dried, and reacted with a polyfunctional crosslinker, such as a polyfunctional epoxide, to produce the imine-linked covalent network polymer. Generally, the reactions are carried out at 60° C. with stirring, and curing is achieved at a temperature greater than 100° C.

Cure Rate Modifying Additives

Traditionally, imine-linked vitrimers are synthesized by preparing a mixture or solution comprising imine-linked oligomers (part A), preparing a separate mixture or solution comprising one or more crosslinkers (part B), and mixing parts A and B together, to create part C, prior to a production process (e.g., prepregging, hand lay-up, film forming, etc.)

According to the present disclosure, a rate of the crosslinking reaction that occurs when the oligomer and crosslinker meet, and which forms the imine-linked vitrimer, is modified (e.g., accelerated) when a cure rate modifying additive is present in part A or part C. The ability to accelerate curing of thermoset resins from a liquid to a solid state is commercially important from economic and processing perspectives. For example, accelerated in-mold curing for prepreg materials can be achieved using the disclosed compositions and methods.

Importantly, the cure rate modifying additive is not a catalyst acting as an intermediary and being regenerated during the reaction. Instead, the cure rate modifying additive is a reagent that is consumed in the reaction and converted into a reaction product. Exemplary cure rate modifying additives include, but are not limited to, imidazoles, t-butyl acetate, anhydrides, diketones (benzil), and other Lewis bases, which accelerate epoxy-amine crosslinking, leading to accelerated curing.

Figure 4:
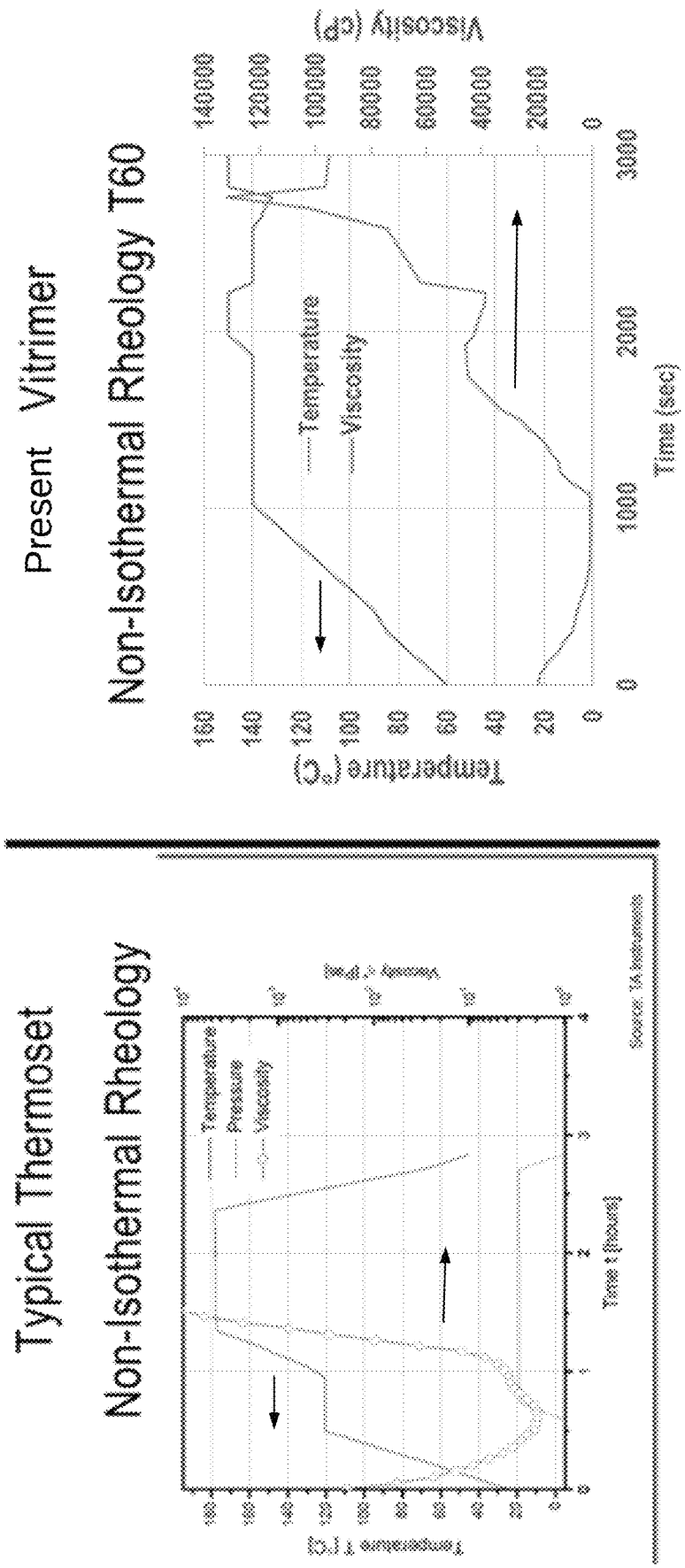
FIG. 4. Graphs showing the unique difference between a traditional thermoset curing (left) and polyimine (imine-linked) vitrimer curing (right) while the temperature is ramped. In a traditional thermoset, once crosslinking begins, upon increasing the temperature, the viscosity will only continue to increase. Conversely, in the polyimine vitrimer system, rapid increases in heating will lead to a decrease in viscosity.
Figure 5:
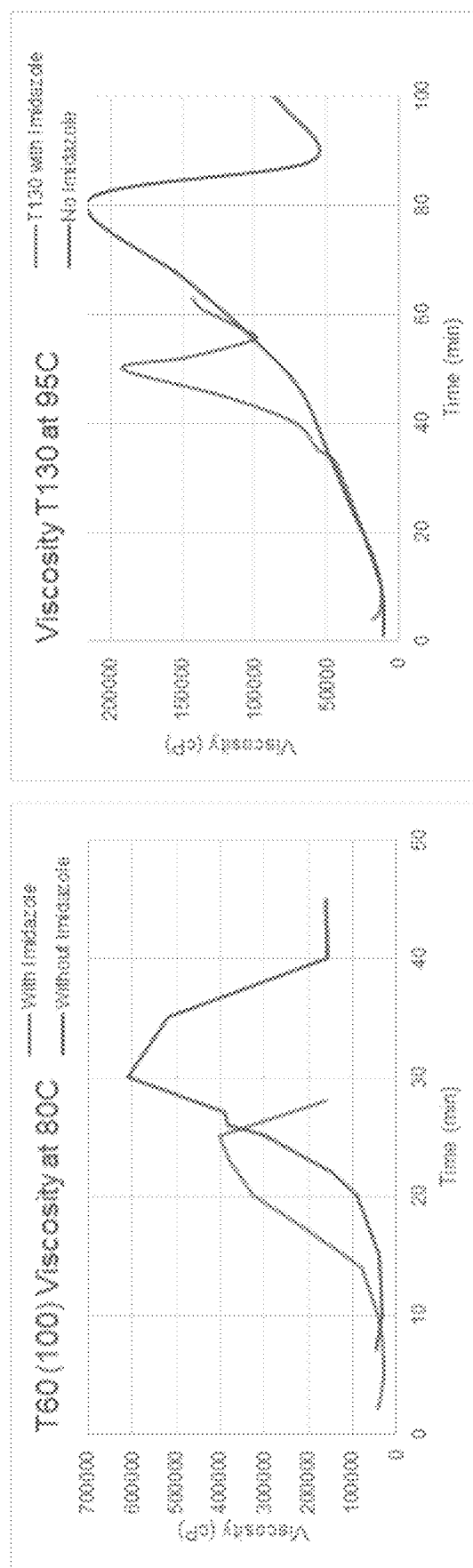
FIG. 5. Graphs showing the change in viscosity profile of two polyimine (imine-linked) vitrimer resin systems curing with crosslinkers in the presence and absence of imidazole accelerant additive. In both cases, the pot life of the material is shortened and upon additional rapid heating, the material with imidazole does not drop viscosity as much as the material without imidazole.

Within the disclosed systems, curing behavior is altered from vitrimer-like curing, which tends to occur relatively slowly in a substantially linear manner, to a more traditional irreversible cure, which increases in a substantially exponential manner over time. However, as shown in FIGS. 4 and 5, accelerated curing of vitrimers induced by cure rate modifying additives can be slowed or reversed by heating the mixture of oligomer, crosslinker, and cure rate modifying additive. This provides an ability to tune the rate at which an active curing process proceeds, e.g., by raising the temperature and reducing viscosity. Without being bound by theory, it is believed that raising the temperature accelerates covalent bond exchange, which effectively retards the gel point and allows for re-flow.

The disclosed vitrimers are reprocessable when heated and recyclable upon exposure to diamines, such that the resulting polymer or polymer-composite can be depolymerized into a mixture of reactants, which can be purified by chemical techniques known in the art if desired.

Several samples using imidazole as the cure rate modifying additive were produced. It was determined that 0.05-5 wt % achieved stiff materials after 40 min at 160° C. Noteably, addition of imidazole allowed for more complete curing in a limited time (40 minutes in-mold) relative to compositions lacking a cure rate modifying additive.

For comparison, in a standard epoxy resin system, such as the bisphenol A/epichlorohydrin liquid resin sold as EPON™ 828, curing with amines begins in approximately 15 minutes, with gelling of the polyamide in about 50 minutes. When imidazole is used as the curing agent in the standard epoxy system, it takes approximately 70 minutes for curing to begin when the temperature is below 57° C.

Various cure rate modifying additives were tested in a hot melt two-part epoxy resin system in order to change curing conditions of prepreg. The testing identified additives that accelerate the cure of the resin system (imine-linked oligomer and epoxy) and additives that accelerate the cure without decreasing the pot life of the resin system.

The tested cure rate modifying additives were: imidazoles (nucleophilic amines), anhydrides, thermal radical initiators, and ionic nucleoplies, such as:

| | |
|---|---|
| 2-ethyl-4-methylimidazole | CAS number 931-36-2 |
| 1-methylimidazole | CAS number 616-47-7 |
| Imidazole | CAS number 288-32-4 |
| Maleic anhydride | CAS number 108-31-6 |
| Succinic anhydride | CAS number 108-30-5 |
| Acetic anhydride | CAS number 108-24-7 |
| t-butyl acetate | CAS number 540-88-5 |
| Benzil | CAS number 134-81-6 |

Viscosity Study

The working viscosity was determined and the pot life and the time required to reach 100,000 cP reported. The viscosity of each CRM additive was found using at least two different weight percentages and compared to the control epoxy resin system containing no additive. A general procedure and parameters for collecting this viscosity data is as follows:

1. The (imine-linked oligomer) resin and epoxy were heated separately at 70° C. for 1-3 hours.
2. The desired weight percentage of the cure rate modifying agent was mixed with the resin and allowed to heat at 70° C. for 3-5 minutes.
3. The epoxy (DER 331) was mixed with the resin and cure rate modifying agent in a 2.5:1 imine-linked oligomer:epoxy ratio.
4. The viscosity was monitored at 60° C. until 100,000 cP was reached.

The tabular form of this viscosity data can be found in Table 1 and the graphical representation can be found in FIG. 1. The additives were categorized into one of the following three general groups:

Group 1: Reagents that increase the pot life at 60° C.
  Examples: 1-methylimidazole, acetic anhydride, and t-butyl acetate
Group 2: Reagents that have little effect on the pot life at 60° C.
  Examples: 2-ethyl-4-methylimidazole and benzil
Group 3: Reagents that decrease the pot life at 60° C.
  Examples: Imidazole, maleic anhydride, and succinic anhydride All the of the reagents in Group 1 are liquids at room temperature and they all decreased the initial viscosity and increased the overall pot life. Another trend seen in Group 1 was that higher weight percentages of the cure rate modifying additive yielded a lower initial viscosity and a longer pot life, whereas the opposite trend was observed in the Group 3 additives.

TABLE 1

Tabular viscosity data of several cure rate modifying (CRM) additives at different weight percentages run at 60° C.

| Group Number | CRM Additive | Weight % of CRM Additive | Initial Viscosity (cP) | Time to Double (min) | Time to 100,000 cP (min) |
|---|---|---|---|---|---|
| — | Control | — | 10,857 | 19 | 37 |
| 2 | 2-ethyl-4-methylimidazole | 5 | 14,400 | 18 | 33 |
| | | 10 | 11,040 | 17 | 34 |

TABLE 1-continued

Tabular viscosity data of several cure rate modifying (CRM) additives at different weight percentages run at 60° C.

| Group Number | CRM Additive | Weight % of CRM Additive | Initial Viscosity (cP) | Time to Double (min) | Time to 100,000 cP (min) |
|---|---|---|---|---|---|
| 1 | 1-methylimidazole | 5 | 7,150 | 23 | 48 |
|   |   | 10 | 4,533 | 31 | 65 |
| 3 | Imidazole | 5 | 10,600 | 13 | 21 |
|   |   | 10 | 9,400 | 13 | 22 |
| 3 | Maleic anhydride | 1 | 33,200 | 20 | 29 |
|   |   | 5 | 77,680 | — | 12 |
|   |   | 10 | 131,000 | — | 2 |
| 3 | Succinic anhydride | 5 | 17,067 | 15 | 30 |
|   |   | 10 | 40,800 | 15 | 16 |
| 1 | Acetic anhydride | 5 | 24,800 | 26 | 55 |
|   |   | 15 | 7,800 | 7 | 63 |
| 1 | t-butyl acetate | 5 | 7,086 | 25 | 62 |
|   |   | 10 | 3,700 | 32 | 94 |
| 2 | Benzil | 5 | 21,067 | 26 | 39 |
|   |   | 10 | 25,800 | 27 | 41 |

Accelerated Curing Study

To understand the curing dynamics of these CRM additives, prepreg was made of each compound containing 5% by weight of the respective CRM additive as well as a 2.5:1 resin:epoxy ratio. Then, small segments of the prepreg were cured at 130° C. in 15-minute intervals up to 60 minutes. The glass transition temperature ($T_g$) was then determined using dynamic mechanical analysis (DMA). A general procedure in accomplishing this is as follows:

1. The (imine-linked oligomer) resin and epoxy were heated separately at 70° C. for 1-3 hours.
2. The CRM additive was added to the resin at 5% by weight, mixed, and allowed to heat for 3-5 minutes at 70° C. in a glass scintillating vial.
3. The epoxy (DER 331) was mixed with the resin and CRM additive in a 2.5:1 resin:epoxy ratio.
4. A resin film was made by pouring 10-14 g of the contents onto a folded piece of release liner and pressing between a heated platen press at 80-100° C. for 2 minutes.
5. The release liner was pulled open while resin remained hot so that resin was coated on both sides.
6. A 12"×12" piece of 4 oz. unidirectional carbon fiber was placed into the folded piece of release liner so that it was in contact with resin on both the top and bottom.
7. The carbon fiber was then pressed in the heated platen press at 80-100° C. for 4 minutes.
8. The impregnated carbon fiber was stored in the refrigerator until ready to cure.
9. When ready to cure, 4 small pieces (approximately 2"×2") of the impregnated carbon fiber were cut and cured at 130° C. at 15, 30, 45, and 60 minutes.
10. The $T_g$ of the carbon fiber composite material at each time point was collected using a DMA run until 185° C. ramping at 5° C./minute and at a strain of 0.003 mm.

In general, as the cure time increased, the $T_g$ also increased. Compared to the control, the CRM additives that decreased the cure time were imidazole, maleic anhydride, and acetic anhydride. These are the general trends of $T_g$ observed in Table 2. In the spectra collected via DMA, there were multiple peaks on the tan delta curve in some cases. These multiple peaks indicate more than one thermal event, where the actual $T_g$ likely lies on some average of the peaks. As the cure time increased on these samples, the peaks often converged as additional crosslinking yields a more homogeneous polymer network resulting in one reported $T_g$ value. When applicable, Table 2 shows multiple values of $T_g$ that indicate as the cure time increases the number of peaks often decreased meaning that the curing has come closer to reaching completion.

Figure 2:
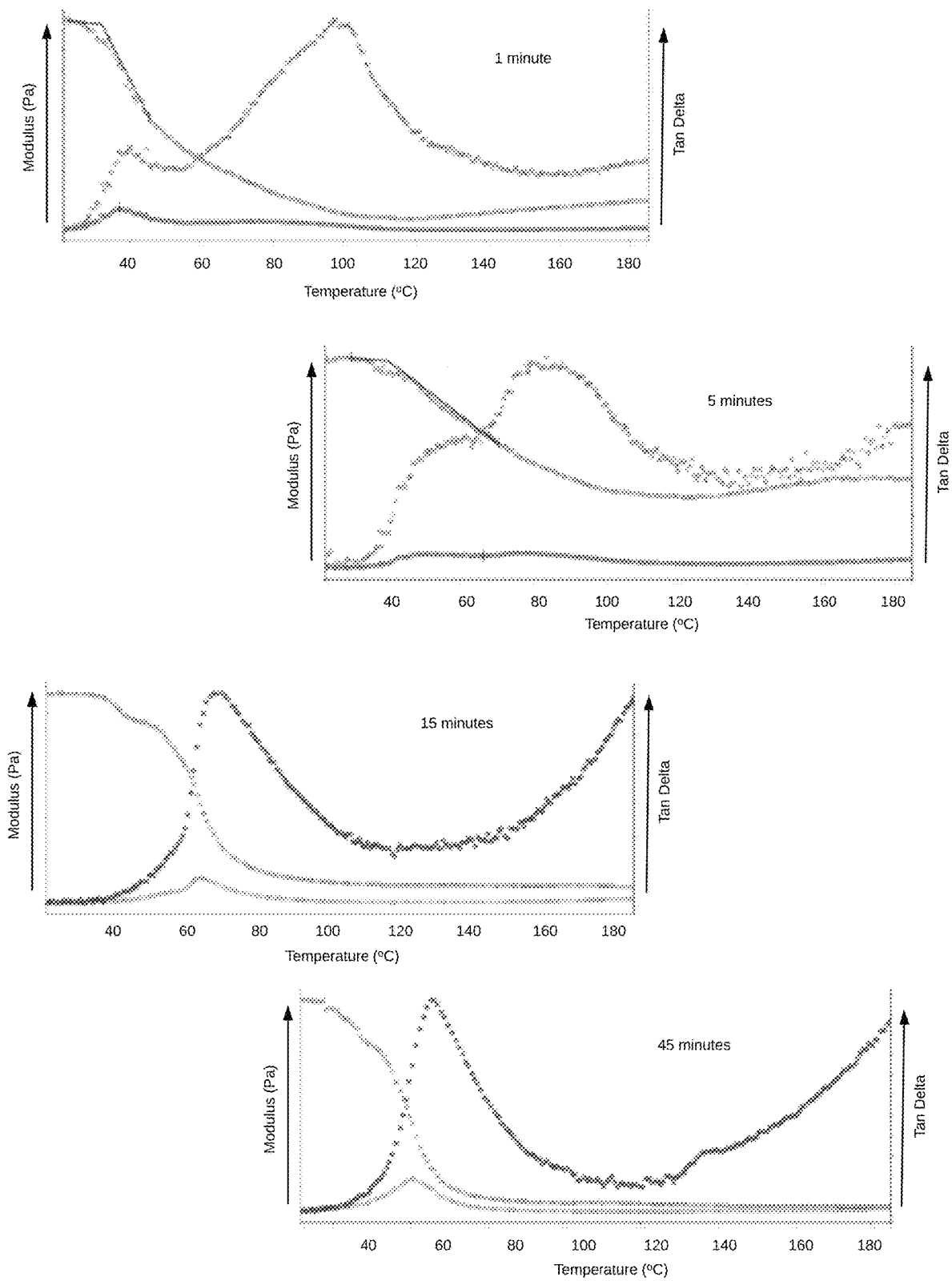
FIG. 2. Dynamic mechanical analysis (DMA) spectra of acetic anhydride at 1, 5, 15, and 45 minutes showing how additional curing is occurring and the peaks on the tan delta are converging.
Figure 3:
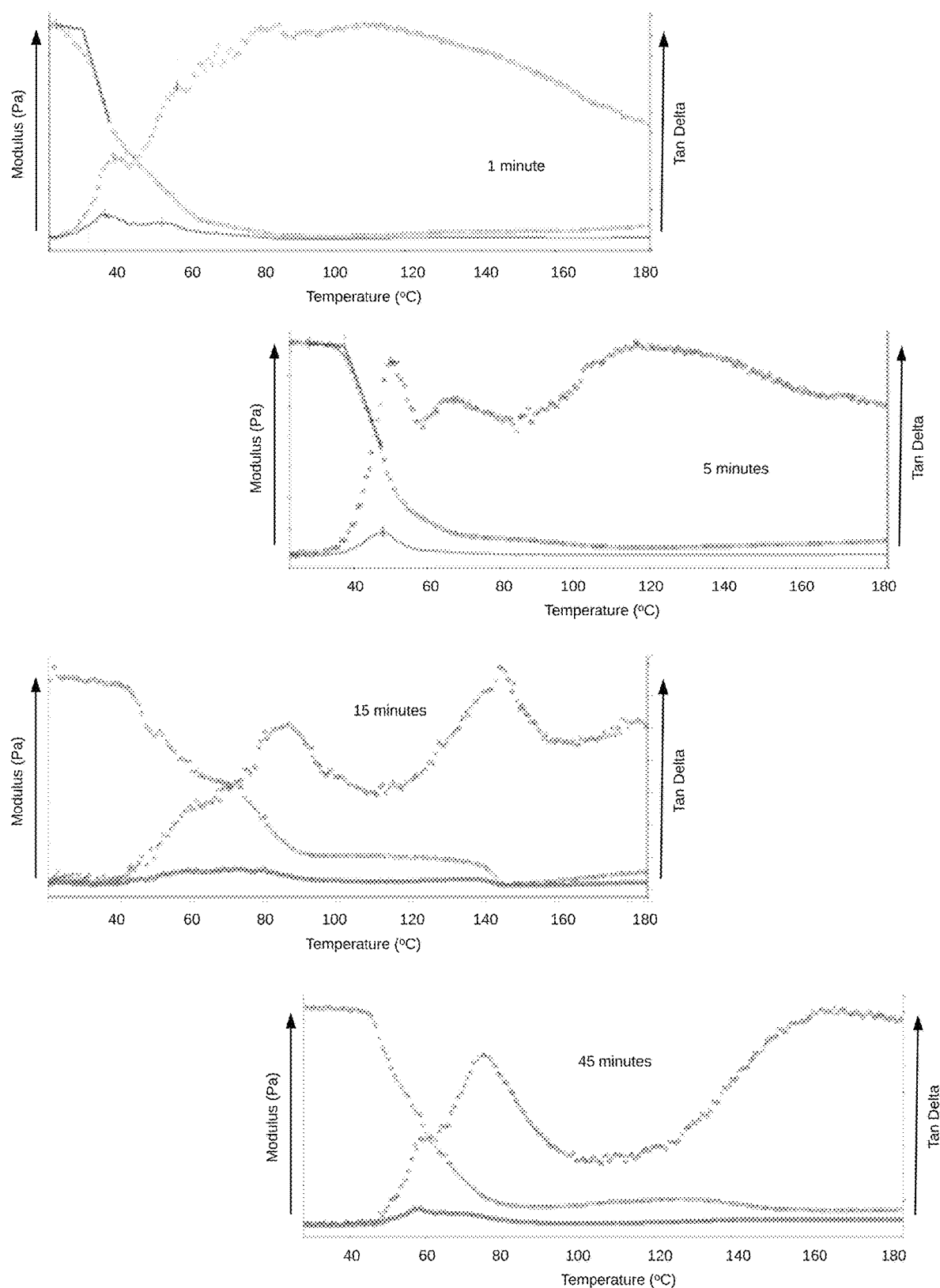
FIG. 3. DMA spectra of the control at 1, 5, 15, and 45 minutes showing how additional curing is occurring and the peaks on the tan delta are converging.

In addition to the 15, 30, 45, and 60-minute time points, a cure time of 1 and 5 minutes was tested on the control and acetic anhydride. Since, the $T_g$ of the control had a narrow range of values at the larger 15-minute time intervals, it was hypothesized that initial curing occurred more quickly than anticipated. The results of the 1- and 5-minute cures on the control showed two distinct peaks on the tan delta where the epoxy resin system is not fully crosslinked and homogenized. The peaks converge as the cure time increases and there is one distinct peak and $T_g$ value as shown in FIG. 2. A similar trend is observed with acetic anhydride at the 1- and 5-minute intervals compared to the longer cure times. Multiple peaks are seen in the shorter cure cycles, but the tan delta peaks do converge in the same way that the control does (FIG. 3). The average $T_g$ of the peaks seen in the acetic anhydride sample show a more representative $T_g$ value and the merging of peaks as time increases indicates curing is reaching completion. Relative to the control that took 15-45 minutes to reach maximum $T_g$ at a given temperature, the samples with CRM additives in the cases of imidazoles and anhydrides, reached maximum $T_g$ (indicating nearly full curing) from 1-15 minutes. Therefore, these additives decreased the cure time.

TABLE 2

Glass transition temperatures in terms of the peak of the tan delta, the peak of the loss modulus, and the onset of prepreg containing different CRM additives cured at 130° C. at various time intervals.

| CRM Additive | Cure Time (min) | Peak Tan Delta 1 (° C.) | Peak Tan Delta 2 (° C.) | Peak Tan Delta 3 (° C.) | Peak Tan Delta 4 (° C.) | Peak Loss Modulus (° C.) | $T_g$ Onset (° C.) |
|---|---|---|---|---|---|---|---|
| Control | 1 | 39 | 97 | — | — | 37 | 32 |
|  | 5 | 54 | 80 | — | — | 66 | 40 |
|  | 15* | 63 | — | — | — | 58 | 46 |
|  | 30* | 65 | — | — | — | 59 | 45 |
|  | 45* | 68 | — | — | — | 64 | 47 |
|  | 60* | 76 | — | — | — | 71 | 57 |
| 2-ethyl-4-methylimidazole | 15 | 68 | — | — | — | 54 | 45 |
|  | 30 | — | — | — | — | — | — |
|  | 45 | 46 | 76 | — | — | 40 | 35 |
|  | 60 | 43 | 60 | 82 | 95 | 42 | 37 |
| 1-methylimidazole | 15 | 60 | — | — | — | 48 | 33 |
|  | 30 | 47 | 67 | — | — | 45 | 34 |
|  | 45 | 63 | — | — | — | 46 | 34 |
|  | 60 | 64 | — | — | — | 50 | 39 |
| Imidazole | 15 | 44 | 86 | 97 | — | 62 | 43 |
|  | 30 | 60 | 102 | — | — | 57 | 49 |
|  | 45 | 80 | 95 | 122 | — | 68 | 62 |
|  | 60 | 51 | 99 | — | — | 59 | 40 |
| Maleic Anhydride | 15 | 87 | 116 | — | — | 82 | 54 |
|  | 30 | 92 | — | — | — | 86 | 59 |
|  | 45 | 95 | — | — | — | 92 | 84 |
|  | 60 | 101 | — | — | — | 101 | 89 |
| Succinic Anhydride | 15 | 59 | 74 | — | — | 58 | 46 |
|  | 30 | 74 | — | — | — | 63 | 52 |
|  | 45 | 82 | — | — | — | 65 | 57 |
|  | 60 | 72 | 88 | — | — | 67 | 60 |
| Acetic Anhydride | 1 | 42 | 59 | 81 | — | 40 | 34 |
|  | 5 | 50 | 67 | 117 | — | 48 | 38 |
|  | 15 | 61 | 86 | 145 | — | 72 | 52 |
|  | 30 | 68 | 144 | — | — | 64 | 48 |
|  | 45 | 58 | 75 | — | — | 58 | 45 |
|  | 60 | 63 | 85 | — | — | 61 | 48 |
| t-butyl Acetate | 15 | 54 | 84 | — | — | 52 | 46 |
|  | 30 | 55 | — | — | — | 53 | 45 |
|  | 45 | 63 | — | — | — | 59 | 44 |
|  | 60 | 63 | — | — | — | 63 | 50 |
| Benzil | 15 | 57 | — | — | — | 55 | 49 |
|  | 30 | 79 | — | — | — | 62 | 48 |
|  | 45 | 66 | — | — | — | 60 | 46 |
|  | 60 | 63 | — | — | — | 62 | 49 |

*Average values reported from triplicate data set.

Conclusions

The experiments show that CRM additives affect the epoxy resin system's curing kinetics. With regard to viscosity, the three agents that increased the pot life relative to the control were 1-methylimidazole, acetic anhydride, and t-butyl acetate. In the curing study, the additives that showed faster cure cycles were imidazole, maleic anhydride, and acetic anhydride. Acetic anhydride stood out in its ability to increase pot life and decrease cure time; however, all compounds tested resulted in increased cure rates in different temperature regimes relative to the control. The compounds tested had varying effects on pot-life (some extended pot-life, while others shortened it), which is a critical parameter for many applications.

The imine-linked oligomer was combined with epoxy and CRM additive(s) in a pultrusion composite process, to infuse resin into glass fibers, allowing for in die dwell times and thus cure times of 3 minutes. The final $T_g$s are reported in Table 3. The non-control sample contained 0.2% imidazole to accelerate the cure in die to just 1-3 minutes.

TABLE 3

In die curing data for resin infused glass fiber.

| Sample | $T_g$ (tan D) (° C.) | $T_g$ Onset (° C.) | Loss modulus (° C.) | Cure Cycle |
|---|---|---|---|---|
| Control 0% imidazole | 90 | 79 | 75 | 150° C. 1 h 180° C. 1 h |
| edge 0.2% imidazole | 104 ± 17 | 79 ± 4 | 73 ± 4 | 180° C. 3 min |
| internal 0.2% imidazole | 84 ± 8 | 77 ± 3 | 64 ± 1 | 180° C. 3 min |

"Edge" samples were taken from the outer 1-3 mm of the part. "Internal" samples were taken from 4-6 mm into the part.

Imidazole data indicates that the use of CRM additives has an unexpected influence on viscosity. In addition, the materials that used a CRM additive were shown to retain recyclability. Lastly, the ability of the accelerated samples to undergo covalent bond exchange to enable consolidation of composite parts and continued polymer healing was unpredictable and proven in experiments.

In some embodiments, chemical mixtures disclosed herein can form covalent network polymer composite materials via wet winding where a filament is passed through a bath of the chemical mixture and then continuously wound onto a mandrel to produce towpreg or prepreg without a release liner. The ability to rapidly cure the covalent network polymers by introducing CRM additives enabled this processing technique, which was previously unachievable with covalent network polymers.

In some embodiments, chemical mixtures disclosed herein can form covalent network polymer composite materials via pultrusion wherein the composite network polymer is substantially cured in a continuous process, and pultruded materials (a.k.a., lineals) are cut to size as they are produced. In an embodiment, the reinforcing fiber is glass fiber or carbon fiber.

Tack Modifying Additives

Tack modifying additives for vitrimers, particularly imine-linked vitrimers, reduce immediate tack and maintain >40 min pot life with a viscosity <30,000 cP. In some embodiments, a cure $T_g$>130° C. is achieved when the mixture is held at 150° C. for a maximum of 8 minutes.

Exemplary tack modifying additives include but are not limited to Metastar501 (Meta Kaolin), talc, HAR TALC T-77, HAR TALC H-92, Atomite (calcium carbonate), stearic acid, lanolin, parafin wax, magnesium stearate, magnesium carbonate, barium sulfate silicas, silicas, silicates, Mica 100K (calcium carbonate), PTFE (Cerflon), glass bubbles (soda lime borosilicate), Wollastonite ($CaSiO_3$-silicate), diatomaceous earth. The tack modifying additives may be present in loadings up to a maximum of 27% by weight, or between 1.5 wt. % and 5 wt. %, or between 2 wt. % and 3 wt. %.

In some embodiments, a slip reagent may be used with a tack modifying additive.

In some embodiments, a weight or molar excess of amine may be added to the reaction mixture.

T130 oligomers (T130 comprises imine-linked oligomers formed from a mixture of diamines, terephthaldehyde, and benzaldehyde, 15-20 g) were mixed in ratios of 1:1, 2:1 or 3:1 (oligomer:epoxy) with 1.5%, 2.5%, or 5% by weight solid additives and 0.3%-3% by weight CRM additives. Samples were mixed for ~3 min then spread onto release liners and stored either in the freezer (0° C.) or the oven (80° C.) for ~5 min. The films were touched, temperatures recorded, and tack was rated from 0-5, with 0 corresponding to no sticking/sounds when separating the glove from the film and 5 corresponding to the resin being so sticky it adhered onto the glove.

A 1:1 oligomer (T130):epoxy (DER 330) ratio provided lower tack than a 3:1 ratio with 5 wt. % talc. Baby powder, wollastonite, and glass bubbles significantly reduced tack but increased viscosity, while CRM additives accelerated curing in the order 3,5-dimethylpyrozole<maleic anhydride<acetic anhydride.

Flame Retardant Additives

A composite matrix comprising an imine-linked vitrimer and Fire Smoke and Toxicity (FST) additives has been developed. The FST additives enhance Fire Retardance (FR) assessed by the UL94 vertical flame test to achieve a UL94-V0 rating. Additional testing includes horizontal burn test, smoke density, and heat release.

Several screening experiments were run on a variety of FST additives incorporated into a variety of T130 resin systems at concentrations between 1-60 wt. %, or between 10-60 wt. %, or between 20-60 wt. %, or between 30-60 wt. %. The finished (cured) composite or resin was then tested using UL94 vertical flame testing. The following classes of FST additives, and combinations of additives, were evaluated:
Polytetrafluoroethylene (PTFE)
Organic brominated compounds (Br)
Aluminum trihydrate (ATH)
Molybdate/Hydroxide complex (MH)
Phosphorous-based Salt (PS)
Organic Phosphorous (OP)
Aluminosilicate (AlSi)
Halloysite (HS)
The following properties were also evaluated:
Tg (DMA)
Moisture absorption (ASTM D570)
Flexural strength (ASTM D790)
Interlaminar Shear (ASTM D2344)
Viscosity (ASTM D2556)
Formulations: >60 formulations were synthesized with polyimine+epoxy. A specified FST additive(s) in methyl ethyl ketone (MEK) was then added. The resin was then impregnated into 3k 2×2 twill carbon fiber, 4.0 oz./sq.yd. unidirectional carbon fiber, and/or casted into resin bar molds for subsequent testing. All materials were then cured, with typical cure cycles that are used for the resin without additives. An abbreviated summary of some of the formulations and the additives and mixtures evaluated is given in the Table 4.

TABLE 4

Effect of incorporating flame retardant/FST additives into imine-linked vitrimers.

| Additive | Weight % | Notes |
| --- | --- | --- |
| Polytetrafluoroethylene (PTFE) | 0.1-60 | Increases pot life, changes plasticity and toughness properties, good consolidation, least efficacy. |
| Phosphorous-based Salt (PS) | 0.1-40 | Great synergist. Achieves V0 alone. Significant reduction in flame and smoke. |
| Aluminum trihydrate (ATH) | 0.1-60 | Higher loadings needed. Achieves V0 alone. |
| Molybdate/Hydroxide complex (MH) | 0.1-20 | Low loadings used, does not dissolve, separates out in resin. Reduces flame, yields charring. |
| Organic Phosphorous (OP) | 0.1-60 | Good for viscosity and pot life. Great synergist. |
| Aluminosilicate (AlSi) | 0.1-50 | Higher loadings needed, gives constant V0. Lowers smoke and flame. |
| Halloysite (HS) | 0.1-60 | Low loadings yields results, increases Tg, significant reduction in flame and smoke. V0 achieved alone. |
| Organic brominated compounds (Br) | 1-30 | Reduces flame time, increases black smoke, strong odor |
| Wollastonite | 1-50 | Enhanced flame properties |

Flame Retardancy: The control T130 resin without any additives failed the UL94-V0 test. During testing, the resin and composite are engulfed in flames during the second exposure to the flame and continued to burn for longer than 10 seconds. The material charred and emitted black smoke but did not drip nor melt.

For high throughput data collection, the UL94 test was only performed on 1-3 samples for each formulation on both composite and resin bars. From the observations made, the FST efficacy was summarized as "Great" (pased at V0-V1), "Moderate" (passed at V1-V2), or "Failure" (failed the vertical flame test). The results are summarized in Table 5.

TABLE 5

Fire Smoke and Toxicity (FST) test results for imine-linked vitrimers incorporating flame retardant additives.

| Additive | Wt. % of total matrix | FST efficacy |
|---|---|---|
| Control | none | Failure |
| ATH | 56 | Great |
| PTFE | 56 | Failure |
| MH | 10 | Failure |
| PS | 25 | Moderate |
| OP | 37 | Great |
| ATH | 43 | Great |
| ATH | 33 | Great |
| Br | 20 | Failure |
| Br | 50 | Moderate |
| ATH/MH | 31/9 resp. | Moderate |
| PS/MH | 31/9 resp. | Failure |
| OP/MH | 37/9 resp. | Great |
| OP/MH/PS | 37/9/15 resp. | Moderate |
| OP/PS | 37/15 resp. | Moderate |
| PS/ATH | 20/20 | Great |
| ATH/MH/PS | 16/9/15 resp. | Great |
| OP/PTFE | 37/15 resp. | Great |
| OP/ATH | 37/15 resp. | Great |
| AlSi | 56 | Great |
| AlSi | 33 | Moderate |
| AlSi/ATH | 17/17 | |
| AlSi/ATH | 7/27 resp. | |
| PS/AlSi | 17/17 | |
| AlSi/OP | 24/30 | |
| OP/ATH | 25/11 | |

TABLE 6

The effect of FST additives on material properties.

| Additive (wt % of total matrix) | Material Property | Effect relative to control |
|---|---|---|
| ATH (13-56) | Tg | No effect |
| | Interlaminar Shear | Hinders consolidation at >30% |
| | Viscosity | Increases viscosity at any loading |
| PS (12-25) | Tg | Increases Tg at >12% loading |
| | Interlaminar Shear | Hinders consolidation at >25% |
| | Viscosity | Increases viscosity at any loading |
| OP (25-37) | Tg | Lowers Tg at >25% |
| | Interlaminar Shear | No effect |
| | Viscosity | Significantly lowers viscosity at >28% |
| AlSi (9-33) | Tg | No effect |
| | Flexural strength | Increases flexural strength >33% |
| | Viscosity | Increases viscosity at any loading |

A pilot-scale prepreg process that films resin into ~100 gsm resin that can then be impregnated into 4.3 oz./sq.yd. unidirectional carbon fiber was used to create prepreg that was then cured and consolidated in a heated hydraulic press. Coupons were cut with a diamond saw and tested.

Imine-linked vitrimers containing flame retardant (FR) additives showed effective fire retardant performance based on standard testing in both resin and composite forms. The resins and composites exhibited mechanical (flexural) stability and were processable in solvent-dip or by a hot-melt method.

Separation and recovery of the composite material (e.g., fiber) from the vitrimer system was possible upon chemical recycling, and reprocessability was maintained after cure via bond exchange-welding and remolding.

Physical Additives

Physical additives, or fillers, were incorporated into imine-linked vitrimers to form recyclable materials. The physical additives include but are not limited to ceramic microspheres, talc, calcium carbonate, mica, wollastonite, elastinite, silica, carbon black, glass bubbles, core-shell rubbers, clays, kaolin, magnesium carbonate, borosilicate, calcium silicate, white calcitic (limestone), diatomaceous earth, and combinations thereof.

The physical additives improve processing dynamics and mechanical properties (flexural strength, toughness, impact resistance, compression, tensile strength, UV resistance, thermal conductivity and heat capacity) of the vitrimers.

Vitrimer systems including the physical additive(s) are processable by hot-melt or solvent-dip methods, and the physical additives (due to their substantial insolubility in vitrimeric recycling solution) can be separated and recovered from the vitrimer system upon chemical recycling.

TABLE 7

Enhancement of vitrimer resin flexural properties with the use of physical additives.

| Sample ID | Flexural Strength (MPa) ASTM D790 | Flexural Modulus (MPa) ASTM D790 |
|---|---|---|
| Control 1: Resin System 289 with 0% additive | 36 | 2200 |
| Resin System 289 with 1% CB | 115 | 3000 |
| Control 2: Resin System 187 with 0% additive | 49 | 3400 |
| Resin System 289 with 33% Halloysite (Dragonite: HP-A) | 63 | 2400 |
| Control 3: Resin System 331 with 0% additive | 55 | 3500 |
| Resin System 331 with 1% CB | 120 | 3500 |
| Resin System 331 with 1% CB & 1% GB | 80 | 4300 |
| Control 4: Resin System 343 | 37 | 1037 |
| Resin System 343 with 1% GB | 39 | 3000 |

GB: glass bubbles;
CB: carbon black

TABLE 8

Enhancement of vitrimer resin composite flexural properties with the use of physical additives in 4 oz unidirectional carbon fiber.

| Sample ID | Flexural Strength (MPa) ISO D790 | Flexural Modulus (GPa) ISO D790 |
|---|---|---|
| Control 1: Resin System 331 with 0% additive | 450 | 40 |
| Resin System 331 with 1% CB | 545 | 50 |
| Resin System 331 with 1% CB & 1% GB (344 + GB) | 450 | 35 |
| Control 2: Resin System 343 with 0% additive | 549 | 50 |
| Resin System 334 with 1% GB in 4 oz Unidirectional CF (343 + GB) | 350 | 40 |

GB: glass bubbles;
CB: carbon black

Viscosity Modifying Additives

Viscosity modifying additives were used to create meltable imine-linked oligomers for neat anhydrous synthesis of vitrimers and vitrimer composites. Use of exchangeable monofunctional aromatic aldehydes (such as benzaldehyde and trans-cinnamaldehyde), monofunctionalized ketones (such as methyl ethyl ketone (MEK) and acetone), and other capping groups that do not allow for polymer growth were used to reduce polarity and molecular weight (MW) of the imine-linked oligomers, thereby reducing viscosity, extending pot-life, and maintaining excellent mechanical properties. Silicone oils, such as amine-fuctionalized, epoxy-functionalized, and non-functionalized silicone oils, were also used as viscosity modifying additives, and xylenes were used to extend pot-life.

Aldehydes have been used in different ratios (2-40 wt. %) and in different synthetic steps, yielding lower melt temperatures and impacting the curing kinetics of the vitrimer system with crosslinkers. These additives may influence the final Tg, but they do not reduce the moisture stability of the system (the materials remain hydrolytically stable), which simply melts and flows at a lower temperature, allowing for favorable composite processing conditions (e.g., viscosities between 100-1,000,000 cP and pot lives of 5 min-6 h) at both the gram and kilogram scales.

Viscosity changes have been demonstrated with the aromatic aldehydes benzaldehyde and cinnamaldehyde, and the silicon oils: KF-353, KF-868, KF-859, X-22-2516, X-22-343 and KP306. KF-353A—Polyether; KF-868—Monoamino; X-22-2516—Polyether with Ion-chain alkyl; KF-859—Diamino; X-22-343—Epoxy; KP-306—40-45% Xylene, 40-45% Ethylbenzene, other 20-10% is friction reducer.

Viscosity variations that are significant with respect to solvent diluent choice have also been shown (e.g., xylenes at 1 wt % and 5 wt % have been evaluated).

Silicon additives were used to increase the pot life of T130 formulations. Si addition was based on a 10:1 ratio (resin:Si additive), DER 331 addition was based on a 2.5:1 ratio (oligomers:epoxy).

TABLE 9

The influence of benzaldehyde on melt viscosity.

| Sample Description | Initial Viscosity | Pot life with Epon828 |
|---|---|---|
| 4002027 control | >1M, does not flow, not processable | n/a, solvent dip only |
| 4002027 + 15 wt % benzaldehyde | 90 C., approx. 80,000 cP | 40 min |
| 4002027 + 13 wt % benzaldehyde | 100 C., approx. 80,000 cP | 6 min |

TABLE 10

The influence of benzaldehyde and trans-cinnamaldehyde on $T_g$ and composite consolidation properties.

| # | Capping Additive | % Capping | Epoxy | $T_g$ onset (° C.) | $T_g$ TanD (° C.) | SBS (Mpa) |
|---|---|---|---|---|---|---|
| 112 | benzaldehyde | 35 | E154/E828 | 71 | 106 | 37.4 |
| 113 | benzaldehyde | 0 | E154 | 97 | 137 | 23.7 |
| 114 | benzaldehyde | 25 | E154 | 86 | 152 | 42.5 |
| 115 | benzaldehyde | 30 | E154 | 63 | 106 | 33.4 |
| 116 | trans-cinnamaldehyde | 10 | E154 | 109 | 159 | 48.8 |
| 117 | trans-cinnamaldehyde | 30 | E154 | 98 | 147 | 40.1 |

TABLE 11

The influence of benzaldehyde and silicon additives on $T_g$ and composite consolidation properties.

| | Benzaldehyde Wt % | Additive | % | Additive Organic Group | $T_g$ onset (° C.) | $T_g$ TanD (° C.) | SBS (Mpa) |
|---|---|---|---|---|---|---|---|
| 144 | 9 | — | — | — | 85 | 103 | 36 |
| 161 | 9 | KF-353 | 3 | Polyether | 108 | 144 | 39 |
| 162 | 9 | KF-868 | 3 | Amino | 105 | 127 | 59 |
| 163 | 9 | KF-859 | 3 | Diamino | 79 | 108 | 46 |
| 164 | 9 | X-22-2516 | 3 | Polyether, long-chain alkyl, aralkyl | 92 | 135 | 53 |
| 165 | 9 | X-22-343 | 3 | Epoxy | 109 | 139 | 56 |

TABLE 12

The influence of various functionalized silicon additives on $T_g$ and composite consolidation, and flexural properties.

| Si additive Used | Formulation | Tg Onset | Tan Delta | Moisture (% water uptake) | ILSS ASTM D2344 | Flexural ASTM D790 | Flexural Modulus |
|---|---|---|---|---|---|---|---|
| Control | 234 | 93 | 126 | 3.16 +/− 0.06 | 45 | 42 | 3600 |
| KF-353A | 172 | 82 | 130 | 3.12 +/− 0.21 | 35 | 59 | 3570 |
| X-22-2516 | 175 | 79 | 108 | 3.3 +/− 0.1 | 33 | 46 | 3600 |

TABLE 12-continued

The influence of various functionalized silicon additives on
$T_g$ and composite consolidation, and flexural properties.

| Si additive Used | Formulation | Tg Onset | Tan Delta | Moisture (% water uptake) | ILSS ASTM D2344 | Flexural ASTM D790 | Flexural Modulus |
|---|---|---|---|---|---|---|---|
| KF-868 | 173 | 116 | 140 | 2.87 +/− 0.04 | 37 | 60 | 3700 |
| KF-859 | 174 | 87 | 127 | 3.22 +/− 0.12 | 48 | 55 | 3510 |
| X-22-343 | 176 | 92 | 123 | 3.1 +/− 0.1 | Not determined | 41 | 3500 |

TABLE 13

The influence of various functionalized
silicon additives on resin viscosity.

| Si additive Used | Initial Viscosity (cP) | Lowest Viscosity (cP) | Time to 100,000 cP from Initial (mins) | Time to Double from Lowest (mins) |
|---|---|---|---|---|
| Control | 35,600 | 29,200 | 27 | 20 |
| KF-353A | 58,067 | 36,000 | 36 | 20 |
| X-22-2516 | 55,400 | 25,000-45,000 | >90 | >90 |
| KF-868 | 84,200 | 35,600 | 30 | 20 |
| KF-859 | 46,560 | 32,200 | 27 | 16 |
| X-22-343 | 19,800 | 16,686 | 50 | 45 |
| KP-306 | 3,600 | 2,743 | 90 | 80 |

Statements Regarding Incorporation by Reference and Variations

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods and devices useful for the present methods and devices can include a large number of optional composition and processing elements and steps. All art-known functional equivalents of materials and methods are intended to be included in this disclosure. Nothing herein is to be construed as an admission that the invention is not entitled to antedate such disclosure by virtue of prior invention.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a molecule" includes a plurality of such molecules and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is/are not specifically disclosed herein.

What is claimed is:

1. A recyclable, moldable and weldable covalent network polymer prepared from an amine-terminated imine-linked oligomer, a crosslinker, a cure rate modifying (CRM) additive, and one or more of a tack modifying additive, a flame retardant additive, a physical additive, and a viscosity modifying additive such that the covalent network polymer exhibits at least two of the following properties:
   i. Tg (Peak Tan Delta) equal to or greater than 60° C.;
   ii. Cure time in the range of 1 minute to 45 minutes;
   iii. Melt viscosity 3,700-131,000 cP;
   iv. Flame retardance: V0 rating in UL94 vertical flame test;
   V. Pot life greater than or equal to 40 minutes;
   vi. Short beam shear strength (aka ILSS) greater than or equal to 33 MPa; and
   vii. Flexural strength greater than or equal to 41 MPa;
      wherein the CRM additive is selected from the group consisting of imidazoles, acetates, diketones, and combinations thereof.

2. The covalent network polymer of claim 1, wherein the crosslinker is a polyfunctional epoxide.

3. The covalent network polymer of claim 1, wherein the CRM additive is selected from the group consisting of 1-methylimidazole, t-butyl acetate, 2-ethyl-4-methylimidazole, benzil, imidazole, and combinations thereof.

4. The covalent network polymer of claim 1, wherein the tack modifying additive is selected from the group consisting of talc, kaolin, calcium carbonate, stearic acid, lanolin, paraffin wax, magnesium stearate, magnesium carbonate, barium sulfate silica, silica, polytetrafluoroethylene (PTFE), glass bubbles, calcium silicate, diatomaceous earth, and combinations thereof.

5. The covalent network polymer of claim 1, wherein the flame retardant additive is selected from the group consisting of polytetrafluoroethylene (PTFE), organic brominated compounds, aluminum trihydrate, molybdate/hydroxide complexes, phosphorous-based salts, organic phosphorous, aluminosilicates, halloysite clays, and combinations thereof.

6. The covalent network polymer of claim 1, wherein the physical additive is selected from the group consisting of ceramic microspheres, talc, calcium carbonate, mica, wollastonite, elastinite, silica, carbon black, glass bubbles, core-shell rubbers, clays, kaolin, magnesium carbonate, borosilicate, calcium silicate, limestone, diatomaceous earth, and combinations thereof.

7. The covalent network polymer of claim 1 further comprising a slip agent.

8. The covalent network polymer of claim 1, wherein the covalent network polymer is a vitrimer and a thermosetting polymer.

9. The covalent network polymer of claim 1, wherein the covalent network polymer is characterized by a glass transition temperature of at least 60° C.

10. A composite comprising the covalent network polymer of claim 1 and a woven, non-woven, unidirectional, chopped or shredded fibrous material.

11. The covalent network polymer of claim 1, wherein presence of the CRM additive increases cure rate, pot life or both relative to a control formulation lacking the CRM additive.

12. The covalent network polymer of claim 1, wherein the flame retardant loading is between 10 wt. % and 60 wt. %.

13. A process for forming a recyclable, moldable and weldable covalent network polymer comprising:
   combining an amine-terminated imine-linked oligomer, a crosslinker, a cure rate modifying (CRM) additive, and one or more of a tack modifying additive, a flame retardant additive, a physical additive, and a viscosity modifying additive, such that the covalent network polymer exhibits at least two of the following properties:
   i. Tg (Peak Tan Delta) equal to or greater than 60° C.;
   ii. Cure time in the range of 1 minute to 45 minutes;
   iii. Melt viscosity 3,700-131,000 cP;
   iv. Flame retardance: V0 rating in UL94 vertical flame test;
   v. Pot life greater than or equal to 40 minutes;
   vi. Short beam shear strength (aka ILSS) greater than or equal to 33 MPa; and
   vii. Flexural strength greater than or equal to 41 MPa;
      wherein the CRM additive is selected from the group consisting of imidazoles, acetates, diketones, and combinations thereof.

14. The process of claim 13 further comprising:
   (i) impregnating a woven, non-woven, unidirectional, chopped or shredded fibrous material with the covalent network polymer;
   (ii) forming a film comprising the covalent network polymer; or
   (iii) forming a three-dimensional object comprising the covalent network polymer.

15. The process of claim 14, wherein the fibrous material is impregnated by a towpreg wet winding process, a pultrusion process, a prepreg process, an infusion process and/or a resin transfer molding process.

16. The process of claim 13, wherein presence of the CRM additive increases cure rate, pot life or both relative to a control formulation lacking the CRM additive.

* * * * *